United States Patent
Grundei et al.

(10) Patent No.: US 10,673,083 B2
(45) Date of Patent: Jun. 2, 2020

(54) FUEL CELL DEVICE WITH A FLUSHING GAS PATH

(71) Applicant: Volkswagen AG, Wolfsburg (DE)

(72) Inventors: Daniel Grundei, Braunschweig (DE); Oliver Berger, Braunschweig (DE); Oliver Kleppa, Hannover (DE)

(73) Assignee: Audi AG, Ingolstadt (DE)

( * ) Notice: Subject to any disclaimer, the term of this patent is extended or adjusted under 35 U.S.C. 154(b) by 16 days.

(21) Appl. No.: 15/126,210

(22) PCT Filed: Dec. 18, 2014

(86) PCT No.: PCT/EP2014/078543
§ 371 (c)(1),
(2) Date: Sep. 14, 2016

(87) PCT Pub. No.: WO2015/139794
PCT Pub. Date: Sep. 24, 2015

(65) Prior Publication Data
US 2017/0117562 A1 Apr. 27, 2017

(30) Foreign Application Priority Data
Mar. 18, 2014 (DE) .................. 10 2014 205 031

(51) Int. Cl.
*H01M 8/04223* (2016.01)
*H01M 8/04119* (2016.01)

(52) U.S. Cl.
CPC ... *H01M 8/04231* (2013.01); *H01M 8/04179* (2013.01); *H01M 2250/20* (2013.01); *Y02T 90/32* (2013.01)

(58) Field of Classification Search
CPC ......... H01M 8/04231; H01M 2250/20; H01M 8/04223; H01M 8/04179; Y02T 90/32
USPC ........................................... 429/444
See application file for complete search history.

(56) References Cited

U.S. PATENT DOCUMENTS

| 6,764,784 B2 | 7/2004 | Gillett et al. | |
|---|---|---|---|
| 2007/0231628 A1 | 10/2007 | Lyle et al. | |
| 2007/0281201 A1* | 12/2007 | Sederquist | H01M 8/04097 429/415 |
| 2008/0193887 A1 | 8/2008 | Hamada | |

(Continued)

FOREIGN PATENT DOCUMENTS

| DE | 10031238 | 1/2002 |
|---|---|---|
| DE | 112008000254 T5 | 12/2009 |

(Continued)

*Primary Examiner* — Cynthia H Kelly
*Assistant Examiner* — Omar M Kekia
(74) *Attorney, Agent, or Firm* — Davidson, Davidson & Kappel, LLC

(57) ABSTRACT

A fuel cell device (1) having a fuel cell (2) with a housing (7) and, accommodated therein, a membrane-electrode assembly (6) with a cathode and an anode, having a cathode gas path (3) that serves to transport a cathode gas and that extends through the membrane-electrode assembly (6) on the cathode side, and having a flushing gas path (5) that serves to transport a flushing gas to flush the housing (7) during operation and that extends through the housing (7) is provided. It is provided that a section of the flushing gas path (5) runs through the cathode gas path (3). In this manner, the fuel cell device (1) has a compact structure of just a few parts.

14 Claims, 2 Drawing Sheets

(56) References Cited

U.S. PATENT DOCUMENTS

| | | | |
|---|---|---|---|
| 2009/0291339 A1 | 11/2009 | Ozeki et al. | |
| 2010/0062298 A1 | 3/2010 | Valensa | |
| 2010/0248045 A1* | 9/2010 | Sakai | H01M 8/04007 429/413 |
| 2011/0045369 A1* | 2/2011 | Nuessle | H01M 8/0444 429/428 |
| 2012/0251908 A1 | 10/2012 | Bhandari et al. | |
| 2013/0189599 A1 | 7/2013 | Tatsui et al. | |
| 2014/0377607 A1 | 12/2014 | Urano | |

FOREIGN PATENT DOCUMENTS

| | | |
|---|---|---|
| DE | 102012100393 | 10/2012 |
| EP | 1747597 B1 | 9/2010 |
| EP | 2224528 | 9/2010 |
| EP | 1542303 | 6/2015 |
| JP | 2005174782 | 6/2005 |
| JP | 2007042597 A | 2/2007 |
| JP | 2007531969 A | 11/2007 |
| JP | 2009021076 A | 1/2009 |
| JP | 2010272305 A | 12/2010 |
| JP | 4676553 | 4/2011 |
| JP | 5190561 B2 | 4/2013 |
| WO | WO2004062060 | 7/2004 |
| WO | WO2008/083706 A1 | 7/2008 |
| WO | WO2013/111256 A1 | 8/2013 |

* cited by examiner

FUEL CELL DEVICE WITH A FLUSHING GAS PATH

The invention relates to a fuel cell device having a fuel cell with a housing and, accommodated therein, a membrane-electrode assembly with a cathode and an anode, having a cathode gas path that serves to transport a cathode gas and that extends through the membrane-electrode assembly on the cathode side, and having a flushing gas path that serves to transport a flushing gas to flush the housing during operation and that extends through the housing.

BACKGROUND

Particularly when the fuel cell is operated with an anode gas containing hydrogen, it can be necessary to remove hydrogen from selected areas of the fuel cell device. For example, after switching off the fuel cell device, it can be necessary to flush the hydrogen out of the anode gas path in order to remove hydrogen residues. Such a fuel cell device is disclosed in the translation of the publication of international application DE 11 2008 000 254 T5. Moreover, it can be necessary to flush the housing that surrounds the membrane-electrode assembly so that hydrogen that has exited the anode gas path can be removed from the housing. Such a fuel cell device is disclosed in U.S. Pat. Appln. No. 2007/0231628 A1.

In order to be able to convey the flushing gas to the housing as well as away from the housing, it is a known procedure in the state of the art to provide lines that convey the flushing gas and to provide other components that, for example, filter the flushing gas. However, these additional lines or other additional components of the flushing gas path complicate the layout of the fuel cell device and they require additional installation space. However, precisely when the fuel cell device is intended for mobile use, for example, in an automobile, the installation space is limited.

SUMMARY OF THE INVENTION

It is an object of the present invention to provide a fuel cell device that has a simple structure and that requires only a small amount of space, whereby hydrogen residues can be removed from the housing with little effort.

This objective is achieved for the above-mentioned fuel cell device in that a section of the flushing gas path runs through the cathode gas path.

Thanks to the use of at least one section of the cathode gas path to convey the cathode gas as well as the flushing gas, fewer components are needed for separately configured sections of the flushing gas path, thereby reducing the installation space needed for the flushing gas path. In particular, when one and the same gas, for example, air from the environment of the fuel cell device, is used as the flushing gas and as the cathode gas, then the flushing gas can be conveyed through sections of the cathode gas path without any difficulty.

The solution according to the invention can be further improved by various embodiments that are each advantageous on their own and that, unless otherwise indicated, can be combined with each other in any desired manner. These embodiments and the advantages associated with them are discussed below.

Thus, in certain sections, the flushing gas path can run through a section of the cathode gas path on the inlet side extending towards the fuel cell and/or through a section of the cathode gas path on the outlet side extending away from the fuel cell. At least in sections, the flushing gas path can be adapted to physical conditions and can be integrated into the cathode gas path so that the available installation space can be efficiently utilized.

The flushing gas path can have a separate section on the inlet side upstream from the housing and/or a separate section on the outlet side downstream from the housing. The flushing gas path can extend through the cathode gas path from an inlet of the cathode gas path to an inlet of the separate section on the inlet side. As an alternative or in addition, the flushing gas path can extend through the cathode gas path from an outlet of the separate section on the outlet side to an outlet of the cathode gas path. Inlets and/or outlets of the cathode gas path and of the flushing gas path can thus be configured jointly so that additional inlets and/or outlets for the flushing gas path are not necessary.

The outlet of the separately configured section of the flushing gas path can open up into a section of the cathode gas path on the inlet side. The section of the cathode gas path on the inlet side conveys cathode gas to the fuel cell and leads, for example, from the inlet of the cathode gas path to the membrane-electrode assembly. If the outlet of the separate section of the flushing gas path opens up into the section of the cathode gas path on the inlet side, then the length of the flushing gas path corresponds to the sum of the length of the separate section of the flushing gas path plus the length of at least the section of the cathode gas path through which the flushing gas is conveyed during operation of the fuel cell. Particularly in the transport direction of the flushing gas downstream from the fuel cell, the entire length of the flushing gas path can thus be longer than the length of the flushing gas path on the outlet side downstream from the fuel cell if this path does not extend at least in sections through the cathode gas path. Owing to the great length of the flushing gas path on the outlet side, hydrogen that has been flushed out of the housing can be catalytically reacted, for example, in the section in which the flushing gas path extends through the cathode gas path. Consequently, there is no need for a separate device to react the hydrogen that has been flushed out of the housing.

Preferably, the outlet of the separate section is connected on the inlet side to a compressor that is arranged in the cathode gas path so as to convey gas. In particular, the outlet can open up into the cathode gas path at a confluence point upstream from the compressor. For example, the outlet is arranged between the cathode gas filter, which is upstream from the compressor, and the compressor, and it is preferably connected to the cathode gas path so as to convey flushing gas. If the outlet of the separate section of the flushing gas path is connected to the an inlet of a compressor arranged in the cathode gas path so as to convey flushing gas, then, during operation of the fuel cell device, the gas pressure in the cathode gas path at the inlet of the compressor can be lower than the pressure at the inlet of the flushing gas line and, for example, than the pressure in the surroundings of the fuel cell device. Such a pressure differential can be sufficient to convey, for instance, the flushing gas coming from the surroundings through the flushing gas path and especially through the housing, so that there is no need for a fan to move the flushing gas through the flushing gas path during operation. This, in turn, reduces the installation space needed for the fuel cell device. Moreover, this cuts down on the amount of energy that would be needed for the operation of a fan.

However, if the housing is also to be flushed with flushing gas when the compressor is not in operation or if the pressure differential is too low, then the fan can be provided to transport the flushing gas. The fuel cell device can have the housing irrespective of the position of the inlet and/or of the outlet of the separate section, whereby the fan is preferably interconnected between the inlet and the outlet of the separate section of the flushing gas path. For example, the fan is arranged between the inlet of the flushing gas path and the housing of the fuel cell in order to transport the flushing gas to the housing at a pressure that is higher than the ambient pressure.

As an alternative, the outlet of the flushing gas path and especially the outlet of the separate section of the flushing gas path on the outlet side can be configured separately from the cathode gas path, so that the arrangement of the outlet can be more effectively adapted to the available installation space and so that there is no need to have a line for the flushing gas leading to the cathode gas path. In particular, there is no need for a connection of a section of the flushing gas path that extends downstream from the fuel cell along the flushing gas transport direction of the flushing gas path—which might take up a great deal of installation space and extend over a long distance—and that leads to the cathode gas path. This, in turn, reduces the installation space needed for the flushing gas path. Moreover, it might be necessary to treat the cathode gas that has passed through the fuel cell and, for example, to regulate its water content. Elements for the treatment of the cathode gas can be dimensioned smaller than elements that are configured for the treatment of the cathode gas as well as additionally of flushing gas that is flowing through the cathode gas path.

The flushing gas path and especially the section that is configured separately from the cathode gas path can have an inlet that is configured separately from the cathode gas path. An inlet of the flushing gas path that is configured independently of the cathode gas path makes it possible to feed the flushing gas into the flushing gas path, independently of the cathode gas. For example, the flushing gas can be removed directly from the ambient air and can be fed into the flushing gas path through a flushing gas filter. Here, it might be the case that no further treatment of the flushing gas will be needed, although it might be necessary to treat the cathode gas and, in particular, to regulate its water content or its temperature. Elements of the fuel cell device for the treatment of the cathode gas can thus be dimensioned such that they treat exclusively the cathode gas but not additionally the flushing gas. Consequently, if only the cathode gas has to be treated, then these treatment elements can be dimensioned smaller than would be the case if the flushing gas as well as the cathode gas had to be treated.

However, the inlet of the separate section of the flushing gas path preferably makes contact with the cathode gas path so as to convey gas. For example, in the transport direction of the cathode gas path downstream from the inlet of the cathode gas path and, for example, downstream from the inlet of a cathode gas filter, the inlet is connected to the cathode gas path so as to convey gas. Thus, the cathode gas filter can filter the cathode gas as well as the flushing gas. As a result, there is no need for a separate filter for the flushing gas.

In particular, the inlet and the outlet of the separate section can make contact with the cathode gas path at a distance from each other so as to convey gas, as a result of which separate inlets and outlets as well as flushing gas filters for the flushing gas are not necessary. A continuous section of the cathode gas path preferably connects the inlet and the outlet of the separate section of the flushing gas path directly to each other so as to convey gas.

Preferably, the continuous section is configured so as to generate a pressure differential between the inlet and the outlet in order to convey the flushing gas during operation of the fuel cell device. Especially if the inlet of the flushing gas path in the flow direction of the cathode gas path is arranged at a distance from and upstream from the outlet of the flushing gas path, a pressure differential of, for instance, 100 millibar can decrease over the course of the continuous line section of the cathode gas path. The pressure differential arises due to a flow resistance of the continuous section when gas flows through it. For example, the continuous section is a line having an inner line cross sectional surface area of 20 mm$^2$ to 100 mm$^2$ and preferably 60 mm$^2$, and having a course that is straight or at least curved. Here, the inlet of the separate section of the flushing gas path along or in the flow direction can be situated downstream from the gas filter for the cathode gas.

The continuous section connects, for example, the inlet of the cathode gas path or the cathode gas filter to the inlet of the compressor that is downstream from the cathode gas filter along the cathode gas path so as to convey cathode gas. Thus, the cathode gas and the flushing gas can flow through the inlet of the cathode gas filter. At the inlet of the separate section of the flushing gas path, the flushing gas is separated from the gas that has flowed through the inlet of the cathode gas filter and it is conveyed through the fuel cell. At the outlet of the separate section of the flushing gas path, the flushing gas enters the cathode gas path once again and from there, it can be conveyed with the cathode gas through the compressor and, on the cathode side, through the fuel cell. The cathode gas—which can comprise the flushing gas—that is coming out of the fuel cell can be discharged from the fuel cell device easily and after undergoing an optional treatment.

BRIEF DESCRIPTION OF THE DRAWINGS

The invention will be explained in the following embodiments making reference to the accompanying drawings. The following is shown.

DETAILED DESCRIPTION

The invention will be explained below by way of example on the basis of embodiments making reference to the accompanying drawings. The various features of the embodiments can be independently combined with each other, as was already explained in the individual advantageous embodiments.

First of all, the structure and function of a fuel cell device according to the invention are described with reference to the embodiment shown in FIG. 1.

Figure 1:
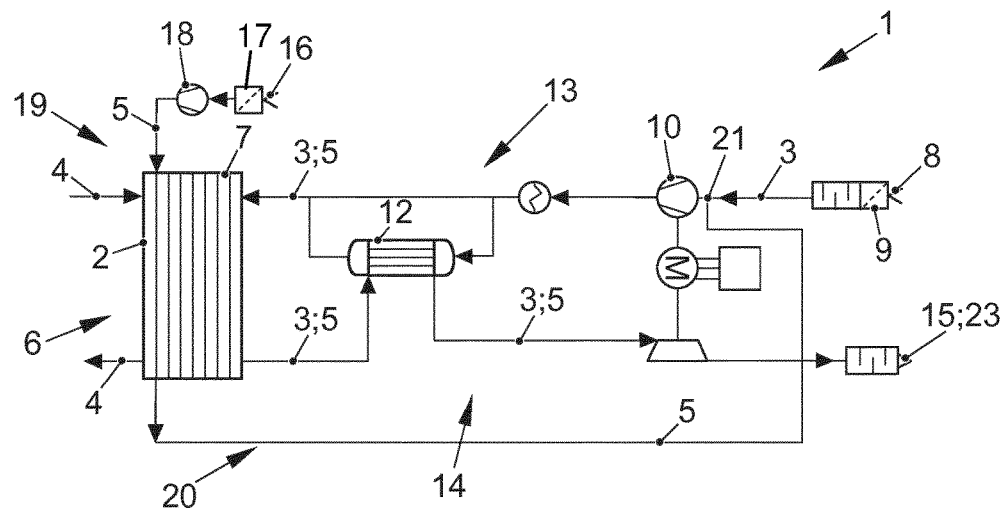
FIG. 1 a schematic view of a first embodiment of the fuel cell device according to the invention, FIG. 2 a schematic view of a second embodiment of the fuel cell device according to the invention, and FIG. 3 a schematic view of a third embodiment of the fuel cell device according to the invention.

FIG. 1 schematically shows the fuel cell device 1 having a fuel cell 2, a cathode gas path 3, a section of an anode gas path 4, and a flushing gas path 5. The transport directions of the gas through the cathode gas path 3, the anode gas path 4, and the flushing gas path 5 are indicated by arrows.

The fuel cell 2 is configured with a membrane-electrode assembly 6 and a housing 7, whereby the membrane-electrode assembly 6 is arranged in the housing 7.

The cathode gas path 3 has an inlet 8 that can be configured, for example, as an inlet of a cathode gas filter 9. Along the cathode gas path 3, there is preferably a compressor 10 that is located downstream from the inlet 8 and by means of which the cathode gas can be transported through the cathode gas path 3. Additional elements for the treatment of the cathode gas can be arranged along the cathode gas path 3 downstream from the compressor 10. These elements for the treatment of the cathode gas are arranged along the cathode gas path 3, for example, between the compressor 10 and the fuel cell 2. For instance, the cathode gas path 3 can have a heat exchanger 11 to regulate the temperature of the cathode gas. As an alternative or in addition, the cathode gas path 3 can have a moisture regulator 12 with which the water content of the cathode gas can be regulated. The heat exchanger 11 and/or the moisture regulator 12 can be bridged by means of bypasses. In the embodiment shown in FIG. 1, only the moisture regulator 12 is depicted as being bridgeable by means of a bypass of the cathode gas path 3.

A section 13 of the cathode gas path 3 on the inlet side extends between the inlet 8 and the fuel cell 2.

The cathode gas path 3 extends on the cathode side through the membrane-electrode assembly 6 and it transports the cathode gas to the cathode of the membrane-electrode assembly 6. A section 14 of the cathode gas path 3 on the outlet side extends in the transport direction of the cathode gas path 3 downstream from the fuel cell 2. The section 14 on the outlet side opens up into an outlet 15 of the cathode gas path 3 and can extend through another moisture regulator or even through the moisture regulator 12 that is already present.

In the embodiment shown in FIG. 1, an inlet 16 of the separate section of the flushing gas path 5 is shown to be configured separately and at a distance from the inlet 8 of the cathode gas path 3. The inlet 16 of the separate section of the flushing gas path 5 is configured, for example, as an inlet of a flushing gas filter 17.

In the transport direction of the flushing gas path 5 downstream from the inlet 16, there is an optional fan 18 that serves to transport the flushing gas through the flushing gas path 5. The fan 18 can especially be arranged along the flushing gas path 5 between its inlet 16 and the housing 7 of the fuel cell 2.

The flushing gas path 5 extends through the fuel cell 2 and especially along the membrane-electrode assembly 6 through the housing 7. A volume surrounding the membrane-electrode assembly 6 inside the housing 7 can be flushed by means of the flushing gas. A section 19 of the separate section of the flushing gas path 5 on the inlet side extends between the inlet 16 and the fuel cell 2.

A section 20 of the separate section of the flushing gas path 5 on the outlet side extends in the transport direction of the flushing gas path 5 downstream from the fuel cell 2. The separate section of the flushing gas path 5 and especially its section 20 on the outlet side extends from the fuel cell 2 to the cathode gas path 3 into whose section 13 the separate section of the flushing gas path 5 on the inlet side opens up. Thus, the flushing gas path 5 of the embodiment shown in FIG. 1 has sections that are configured separately from the cathode gas path 3, namely, the section 19 on the inlet side and the section 20 on the outlet side. The flushing gas mixes with the cathode gas at an outlet 21 of the separately configured section of the flushing gas path 5 located downstream from the outlet 21.

In the embodiment shown in FIG. 1, the outlet 21 is interconnected between the inlet 8 of the cathode gas path 3 and the fuel cell 2, and especially upstream from the compressor 10. Upstream from the compressor 10, a lower gas pressure prevails in the cathode gas path 3 than in the vicinity of the fuel cell device 1 and than in the section 19 of the flushing gas path 5 on the inlet side. This pressure differential can be sufficient to transport enough flushing gas through the fuel cell 2. The optional fan 18 can be provided so that the fuel cell 2 can be flushed if the pressure is not sufficient or if the compressor 10 is at a standstill.

Downstream from the outlet 21 of the separately configured section of the flushing gas path 5, the flushing gas path 5 extends through the cathode gas path 3 so that the flushing gas flows through the section 13 of the cathode gas path 3 on the inlet side through the fuel cell 2 and through the section 14 of the cathode gas path 3 on the outlet side. In the embodiment shown in FIG. 1, the outlet 15 of the cathode gas path 3 and an outlet 23 of the flushing gas path 5 form a shared outlet through which the gas that has entered through the inlet 8 of the cathode gas path 3 and through the inlet 16 of the flushing gas path 5 is discharged during operation.

The section of the cathode gas path 3 between the outlet 21 and the outlet 15 can be a collector that conveys the flushing gas as well as the cathode gas.

Figure 2:
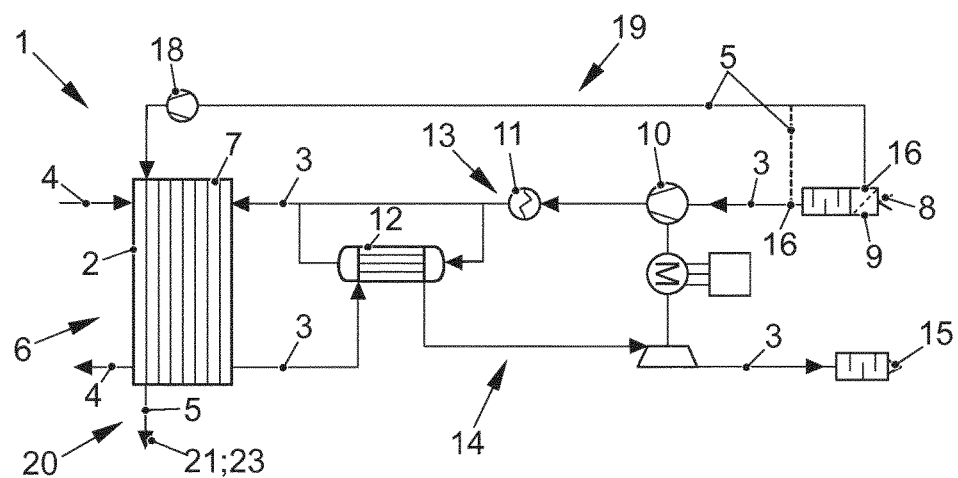

FIG. 2 schematically shows another embodiment of the fuel cell device 1 according to the invention. The same reference numerals are used for elements that have the same function and/or the same structure as elements of the embodiment shown in FIG. 1. For the sake of brevity, only the differences from the embodiment shown in FIG. 1 will be discussed below.

The inlet 16 of the separate section of the flushing gas path 5 is not provided separately in the embodiment shown in FIG. 2. Rather, the inlet 16 of the separate section of the flushing gas path 5 in the embodiment shown in FIG. 2 is located downstream from the inlet 8 of the cathode gas path 3 and it is arranged, for instance, between the inlet 8 and the compressor 10. The section 19 on the inlet side with the optional fan 18 extends between the inlet 16 and the fuel cell 2. For example, the inlet 16 can be connected to an outlet of the cathode gas filter 9. As an alternative and as is indicated by the dotted line, the inlet 16 can also branch off from a continuous section 24 of the cathode gas path 3, for instance, a tube or a pipe, that is located downstream from the cathode gas filter 9 and that leads away from it.

After the gas has flowed through the fuel cell 2, the section 20 on the outlet side can be configured in such a way that it no longer opens up into the cathode gas path 3. For example, the outlet 23 of the flushing gas path 5 can open up into the vicinity of the fuel cell device 1.

The collector depicted in the embodiment shown in FIG. 2, which conveys the flushing gas as well as the cathode gas during operation, extends from the inlet 8 to the inlet 16.

Figure 3:
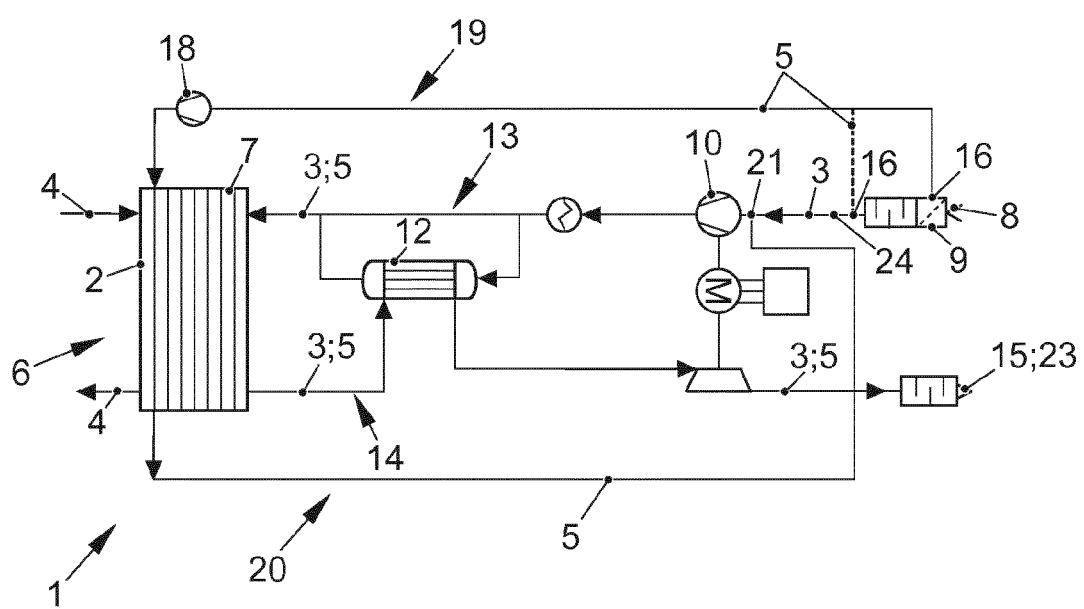

FIG. 3 schematically shows another embodiment of the fuel cell device 1 according to the invention. The same reference numerals are used for elements that have the same function and/or the same structure as elements of the preceding embodiments. For the sake of brevity, only the differences from the preceding embodiments will be discussed below.

The section 19 of the cathode gas path 5 on the inlet side shown in FIG. 3 corresponds to the section 19 of the embodiment shown in FIG. 2. The section 20 of the separate section of the flushing gas path 5 on the outlet side of the embodiment shown in FIG. 3, however, corresponds to the section 20 of the flushing gas path 5 on the outlet side of the embodiment shown in FIG. 1. The continuous section 24 connects the inlet 16 of the separate section of the flushing gas path 5 to its outlet 21 so as to convey gas. The inlet 16 is arranged upstream from the outlet 21 in the transport direction of the cathode gas path 3. For example, the continuous section 24 comprises the cathode gas filter 9. As an alternative, the continuous section 24 can also consist merely of a cathode gas line such as a pipe or a tube.

The fuel cell device 1 of the embodiment shown in FIG. 3 has two collectors, namely, the collectors of the embodiments shown in FIGS. 1 and 2.

LIST OF REFERENCE NUMERALS

1 fuel cell device
2 fuel cell
3 cathode gas path
4 anode gas path
5 flushing gas path
6 membrane-electrode assembly
7 housing
8 inlet of the cathode gas path
9 cathode gas filter
10 compressor
11 heat exchanger
12 moisture regulator
13 section of the cathode gas path on the inlet side
14 section of the cathode gas path on the outlet side
15 outlet of the cathode gas path
16 inlet of the separate section of the flushing gas path
17 flushing gas filter
18 fan
19 section of the separate section of the flushing gas path on the inlet side
20 section of the separate section of the flushing gas path on the outlet side
21 outlet of the separately configured section of the flushing gas path
23 outlet of the separate section of the flushing gas path
24 continuous section of the cathode gas path

What is claimed is:

1. A fuel cell device comprising:
a fuel cell with a housing;
a membrane-electrode assembly with a cathode and an anode and accommodated in the housing, the membrane-electrode assembly having a cathode gas path serving to transport a cathode gas and extending through the membrane-electrode assembly on a cathode side and an anode gas path extending through the membrane-electrode assembly on an anode side; and
a flushing gas path serving to transport a flushing gas to flush the housing during operation and extending through the housing, a section of the flushing gas path running through the cathode gas path;
the flushing gas path entering the housing at a first location separate from the anode gas path and the cathode gas path; and
the flushing gas path enters the housing solely at the first location and an inlet of the flushing gas path is in the cathode gas path.

2. The fuel cell device as recited in claim 1 wherein, in certain sections, the flushing gas path runs through a section of the cathode gas path on an inlet side extending towards the fuel cell or through a further section of the cathode gas path on an outlet side extending away from the fuel cell.

3. The fuel cell device as recited in claim 1 wherein the flushing gas path has a separate section on an inlet side upstream from the housing and a further separate section on an outlet side downstream from the housing, and the flushing gas path extending through the cathode gas path from an inlet of the cathode gas path to a further inlet of the separate section on an inlet side, or the flushing gas path extends through the cathode gas path from an outlet of the further separate section on the outlet side to an outlet of the cathode gas path, the separate section on the inlet side upstream from the housing being connected to the inlet.

4. The fuel cell device as recited in claim 3 wherein a further outlet of the separate section or the outlet of the further separate section opens up into a section of the cathode gas path on the inlet side.

5. The fuel cell device as recited in claim 3 wherein a further outlet of the separate section or the outlet of the further separate section is connected to a compressor arranged in the cathode gas path on the inlet side so as to convey gas.

6. The fuel cell device as recited in claim 3 wherein, in the transport direction of the cathode gas path downstream from a cathode filter inlet of a cathode filter, the further inlet of the separate section makes contact with the cathode gas path so as to convey gas.

7. The fuel cell device as recited in claim 3 wherein the further inlet and the outlet make contact with the cathode gas path at a distance from each other so as to convey gas.

8. The fuel cell device as recited in claim 7 wherein a continuous section of the cathode gas path connects the further inlet and the outlet to each other so as to convey gas.

9. The fuel cell device as recited in claim 8 wherein the continuous section is configured so as to generate a pressure differential between the further inlet and the outlet in order to convey the flushing gas during operation of the fuel cell device.

10. The fuel cell device as recited in claim 1 further comprising a fan to transport the flushing gas.

11. The fuel cell device as recited in claim 1 wherein the flushing gas path enters the housing at the first location and a second location where the cathode gas path also enters the housing.

12. The fuel cell device as recited in claim 1 wherein the inlet of the flushing gas path is connected to or downstream of a cathode gas filter in the cathode gas path.

13. The fuel cell device as recited in claim 1 wherein the inlet of the flushing gas path is connected to or downstream of a cathode gas filter in the cathode gas path.

14. A fuel cell device comprising:
a fuel cell with a housing;
a membrane-electrode assembly with a cathode and an anode and accommodated in the housing, the membrane-electrode assembly having a cathode gas path serving to transport a cathode gas and extending through the membrane-electrode assembly on a cathode side and an anode gas path extending through the membrane-electrode assembly on an anode side; and
a flushing gas path serving to transport a flushing gas to flush the housing during operation and extending through the housing, a section of the flushing gas path running through the cathode gas path,
an outlet of the flushing gas path being separate from the cathode gas path and the anode gas path.

* * * * *